(12) United States Patent
Chen

(10) Patent No.: US 11,250,732 B2
(45) Date of Patent: Feb. 15, 2022

(54) SCREEN STICKER AND METHOD FOR MAKING THE SAME

(71) Applicant: Gang Chen, Yanling County (CN)

(72) Inventor: Gang Chen, Yanling County (CN)

( * ) Notice: Subject to any disclaimer, the term of this patent is extended or adjusted under 35 U.S.C. 154(b) by 0 days.

(21) Appl. No.: 16/265,254

(22) Filed: Feb. 1, 2019

(65) Prior Publication Data
US 2020/0251023 A1 Aug. 6, 2020

(51) Int. Cl.
  *G09F 3/10* (2006.01)
  *G09F 3/02* (2006.01)
  *B32B 37/12* (2006.01)
  *B32B 37/06* (2006.01)
  *B32B 7/12* (2006.01)
  *B32B 7/06* (2019.01)

(52) U.S. Cl.
  CPC .......... *G09F 3/10* (2013.01); *B32B 7/06* (2013.01); *B32B 7/12* (2013.01); *G09F 3/02* (2013.01); *G09F 2003/0202* (2013.01); *G09F 2003/023* (2013.01); *G09F 2003/0257* (2013.01)

(58) Field of Classification Search
  None
  See application file for complete search history.

(56) References Cited

U.S. PATENT DOCUMENTS

| | | | | |
|---|---|---|---|---|
| 4,678,703 A * | 7/1987 | Shibasaki | ............... | D04H 3/16 442/337 |
| 5,021,275 A * | 6/1991 | Kim | ..................... | B44C 1/105 428/202 |
| 5,242,963 A * | 9/1993 | Mao | ....................... | C09J 7/385 524/272 |
| 6,150,035 A * | 11/2000 | DeFife | ................... | B32B 27/10 428/500 |
| 6,870,006 B2 * | 3/2005 | Cavalli | ................. | C09J 133/02 525/123 |
| 2009/0139891 A1 * | 6/2009 | Oshima | ............... | B41M 7/0027 206/497 |
| 2012/0295055 A1 * | 11/2012 | Kurihara | ................. | G09F 3/02 428/43 |
| 2017/0023715 A1 * | 1/2017 | Kim | ..................... | G02B 5/3083 |

OTHER PUBLICATIONS

Packing Tape Image Transfers & DIY Clear Labels, Oct. 21, 2016, 25 pages. (Year: 2016).*

* cited by examiner

*Primary Examiner* — Linda L Gray

(57) ABSTRACT

The invention discloses a screen sticker comprising a backside coated release paper and a screen printed label, wherein the screen printed label comprises a removable glue layer, a filler layer, a mesh layer and a frosted glue layer. A method for making the screen sticker comprises the steps of: spreading and flattening the backside coated release paper on a work table; printing the desired pattern on the backside coated release paper; laying the mesh layer on the filler layer and then printing the filler layer on the removable glue layer with the pattern; printing the frosted glue layer on the mesh layer; and cutting the resulting screen sticker. The screen sticker of the invention can be repeatedly cleaned for use.

6 Claims, 1 Drawing Sheet

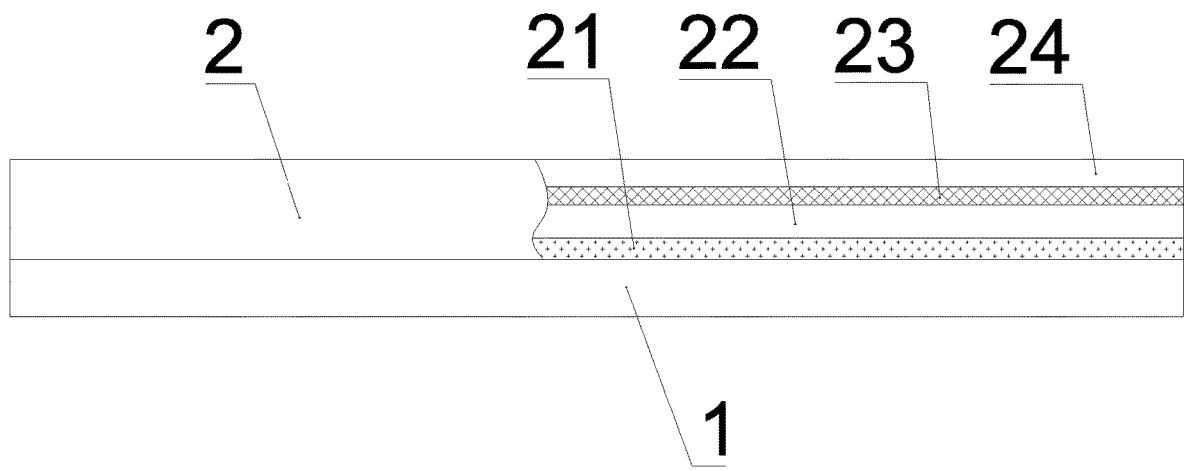

SCREEN STICKER AND METHOD FOR MAKING THE SAME

FIELD OF THE INVENTION

The invention relates to a screen sticker, and particularly to a screen sticker in which a pattern can be formed by painting on an object with a pen or ink, and a method for making the same.

BACKGROUND OF THE INVENTION

Stickers belong to adhesive-type dry-gummed paper. Common stickers on the current market are formed by printing various pictures and photos on dry-gummed paper. Such stickers are also popular fashion products for teenagers and young people, which can be adhered to multi-element products such as stationery, cups and bowls, furniture, electrical appliances, metalware, porcelain, motor vehicles or non-motor vehicles, mobile phones, notebooks, game machines, advertising trademarks and industrial indicators, have a wide range of applications, and also are key products in the printing industry. Such stickers are also printed with various kinds of patterns such as cartoon characters, which can be arbitrarily pasted, but the majority of which are disposable. Moreover, such stickers have many varieties.

For existing stickers, only patterns generally need to be torn off and adhered to objects, but the patterns are generally difficult to be removed after being adhered, and such patterns are easily stained, which affects the aesthetic appearance and causes certain pollution to the environment. In view of the current situation, it is therefore urgent to develop a screen sticker and a method for making the same to overcome the disadvantages in the current practical applications.

SUMMARY OF THE INVENTION

An object of the invention is to provide a screen sticker so as to solve the problems mentioned in the background art.

To achieve the above object, the invention provides the following technical solutions.

A screen sticker comprises a backside coated release paper and a screen printed label, wherein the screen printed label comprises a removable glue layer, a filler layer, a mesh layer and a frosted glue layer, the backside coated release paper is in contact with the removable glue layer, and the filler layer, the mesh layer and the frosted glue layer are sequentially arranged on the removable glue layer, in which the filler layer consists of white adhesive cement, glue and a color masterbatch.

As a further embodiment of the invention, the backside coated release paper is a 180 g release paper. As a further embodiment of the invention, the mesh layer is composed of polyester monofilaments.

As a further embodiment of the invention, the removable glue layer is an aqueous synthetic emulsion composed of an acrylate monomer.

A method for making the screen sticker comprises the steps of:
S1: spreading and flattening the backside coated release paper on a work table;
S2: printing the desired pattern on the backside coated release paper by screen printing of the removable glue layer;
S3: printing the filler layer on the removable glue layer with the pattern while laying the mesh layer on the filler layer;
S4: printing the frosted glue layer on the mesh layer; and
S5: cutting the resulting screen sticker based on the desired length and width.

As a further embodiment of the invention, in the step S3, the filler layer comprises 45% of white adhesive cement, 45% of glue and 10% of a color masterbatch, the white adhesive cement is an acrylic emulsion, and the white adhesive cement, the glue and the color masterbatch are stirred at normal temperature for 30 min to form a filler.

As a further embodiment of the invention, in the step S4, the frosted glue layer is mainly composed of hot melt powder and resin, and the surface of the frosted glue layer is uneven.

Compared with the prior art, the invention has the following beneficial effects: the screen sticker can be used in places in need of printed patterns such as walls, toys and books, and can also provide DIY to the color of the patterns, which enhances the users' practical operation ability, provides fun and facilitates intelligence development; and because the screen sticker does not stick to objects and is easy to tear off, leaving the patterns only without glue or viscous substances, the screen sticker is environmentally friendly, durable, easy to operate and cost-effective, and can be repeatedly cleaned for use.

BRIEF DESCRIPTION OF THE DRAWINGS

The sole FIGURE is a schematic structural view of the invention.

In the FIGURE, 1—backside coated release paper; 2—screen printed label; 21—removable glue layer; 22—filler layer; 23—mesh layer; 24—frosted glue layer.

DETAILED DESCRIPTION OF THE INVENTION

The technical solutions in the embodiments of the invention will be clearly and completely described below in conjunction with the drawings in the embodiments of the invention. It is apparent that the described embodiments are only part of rather than all of the embodiments in the invention. Based on the embodiments of the invention, all other embodiments obtained by the ordinary persons skilled in the art without inventive work belong to the protection scope of the invention.

Referring to the sole FIGURE, in an embodiment of the invention, a screen sticker comprises a backside coated release paper 1 and a screen printed label 2, wherein the backside coated release paper 1 is a common 180 g release paper (other articles can be used instead as backside coating materials); and the screen printed label 2 comprises a removable glue layer 21, a filler layer 22, a mesh layer 23 and a frosted glue layer 24. Specifically, the backside coated release paper 1 is in contact with the removable glue layer 21, and the filler layer 22, the mesh layer 23 and the frosted glue layer 24 are sequentially arranged on the removable glue layer 21, in which the filler layer 22 consists of white adhesive cement, glue and a color masterbatch.

A method for making the screen sticker comprises the steps of:
S1: spreading and flattening the backside coated release paper 1 on a work table;
S2: printing the desired pattern on the backside coated release paper 1 by screen printing of the removable glue layer 21;
S3: printing the filler layer 22 on the removable glue layer 21 with the pattern while laying the mesh layer 23 on the filler layer 22;

S4: printing the frosted glue layer 24 on the mesh layer 23; and

S5: cutting the resulting screen sticker based on the desired length and width.

The filler layer 22 comprises 45% of white adhesive cement, 45% of glue and 10% of a color masterbatch, wherein the white adhesive cement (an acrylic emulsion), the glue and the color masterbatch are stirred at normal temperature for about 30 min to form a filler, the color masterbatch is mainly used as the color of a finished product of the screen printed label 2, and the filler layer 22 can be thick or thin. The mesh layer 23 is mainly composed of polyester monofilaments. The frosted glue layer 24 is mainly composed of hot melt powder and resin, the surface of the frosted glue layer 24 is uneven, and the anti-slip performance facilitates the application of ink.

The removable glue layer 21 is scientifically known as an aqueous synthetic emulsion (an acrylic monomer), and removable glue is arranged at the lowermost layer of the screen printed label 2 and can be easily torn off from the backside coated release paper 1 without residual glue adhesions, thus providing convenience in use. The mesh layer 23 is laid on the removable glue layer 21 printed with the pattern, the pattern can be clearly displayed on the mesh after the mesh layer 23 is laid, areas without the pattern cover the mesh by glue while areas with the pattern are displayed by the mesh, and then the frosted glue layer 24 is printed to protect the pattern, so that ink can easily penetrate through the mesh to leave the pattern on the wall surface or other objects when in use. The screen sticker can be used in places in need of printed patterns such as walls, toys and books, and can also provide DIY to the color of the patterns, which enhances the users' practical operation ability, provides fun and facilitates intelligence development; and because the screen sticker does not stick to objects and is easy to tear off, leaving the patterns only without glue or viscous substances, the screen sticker is environmentally friendly, durable, easy to operate and cost-effective, and can be repeatedly cleaned for use.

The screen sticker is used as follows: the screen printed label 2 is torn off from the backside coated release paper 1, placed on an object in need of a pattern (such as a wall, a toy and a desk) and flattened, then the pattern of the screen printed label 2 is painted with a pen or ink, the screen printed label 2 can be removed immediately after the pattern is completely covered with ink and allowed to stand still for a while, and then the pattern on the screen sticker can be clearly displayed on the object, wherein the pattern can be painted in multiple colors with the ink or pen.

The pattern on the screen sticker can be set according to one's own needs, and then a pattern template is placed on an object, and the surface of the pattern is painted with a pen or ink to form an overall pattern on the object. The color of the pattern can be collocated according to one's own needs, which can be achieved without pasting. The printed label can be used repeatedly and the pattern can also be easily washed off by using a specific ink, thus facilitating use and simplifying operation.

The above description is only a preferred embodiment of the invention. It should be noted that those skilled in the art can also make several variations and improvements without departing from the concept of the invention, these variations and improvements should also be considered as the protection scope of the invention, and none of these variations and improvements will affect the implementation effects of the invention and the utility of the patent.

The invention claimed is:

1. A method for making a screen sticker, comprising the steps of:
   S1: spreading and flattening a backside coated release paper on a work table;
   S2: screen printing a removable glue layer to print a pattern on the backside coated release paper;
   S3: printing a filler layer on the removable glue layer and laying a mesh layer on the filler layer, wherein the pattern is displayed through the mesh layer and the mesh layer is configured to allow ink to penetrate therethrough; and
   S4: printing a frosted glue layer on the mesh layer to get the screen sticker.

2. The method for making the screen sticker according to claim 1, wherein in the step S3, the filler layer is prepared by 45% of white adhesive cement, 45% of glue and 10% of a color masterbatch, the white adhesive cement is an acrylic emulsion.

3. The method for making the screen sticker according to claim 1, wherein in the step S4, the frosted glue layer is composed of resin and hot melt powder, and a surface of the frosted glue layer is uneven.

4. The method for making the screen sticker according to claim 1, wherein the backside coated release paper is a 180 g release paper.

5. The method for making the screen sticker according to claim 1, wherein the mesh layer is composed of polyester monofilaments.

6. The method for making the screen sticker according to claim 1, wherein the removable glue layer is an aqueous synthetic emulsion composed of an acrylate monomer.

* * * * *